(12) United States Patent
Johnson et al.

(10) Patent No.: US 6,264,227 B1
(45) Date of Patent: Jul. 24, 2001

(54) MOVEABLE STEPS FOR A VEHICLE

(75) Inventors: Brad Johnson, Harwood; Thomas G. Lykken, Fargo, both of ND (US); Bryan J. Garberg, Moorhead, MN (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/164,616

(22) Filed: Oct. 1, 1998

(51) Int. Cl.[7] .................................................. B60R 3/00
(52) U.S. Cl. .......................... 280/400; 280/166; 182/127; 180/9.1
(58) Field of Search ................ 182/127, 97; 180/9.1; 280/762, 769, 163, 164.1, 166, 400, 764.1

(56) References Cited

U.S. PATENT DOCUMENTS

| | | | |
|---|---|---|---|
| 2,583,894 | * | 1/1952 | Shuck . |
| 4,074,786 | * | 2/1978 | Joubert ................................ 180/68.5 |
| 4,131,293 | * | 12/1978 | Kindle .................................. 280/166 |
| 4,245,716 | * | 1/1981 | Rayfield ................................. 182/86 |
| 4,482,029 | * | 11/1984 | Prochaska .............................. 182/96 |
| 4,679,810 | * | 7/1987 | Kimball ............................... 280/166 |
| 5,813,494 | * | 9/1998 | Ulschmid et al. ..................... 182/97 |
| 5,988,316 | * | 11/1999 | Hedley ................................ 182/127 |
| 6,000,496 | * | 12/1999 | Rinaldi ................................ 182/127 |
| 6,068,277 | * | 5/2000 | Magnussen .......................... 280/166 |
| 6,179,312 | * | 1/2001 | Paschke et al. ...................... 280/166 |

FOREIGN PATENT DOCUMENTS

4218006 * 12/1993 (DE) .................................... 280/166

* cited by examiner

*Primary Examiner*—Brian L. Johnson
*Assistant Examiner*—Avraham H. Lerner
(74) *Attorney, Agent, or Firm*—Foley & Lardner

(57) ABSTRACT

A system for moving a step assembly in response to maneuvers of an articulated work vehicle. The step assembly moves to avoid interference with the vehicle's wheels or tracks. A push rod assembly provides actuation to the step assembly in response to the vehicle motions.

20 Claims, 5 Drawing Sheets

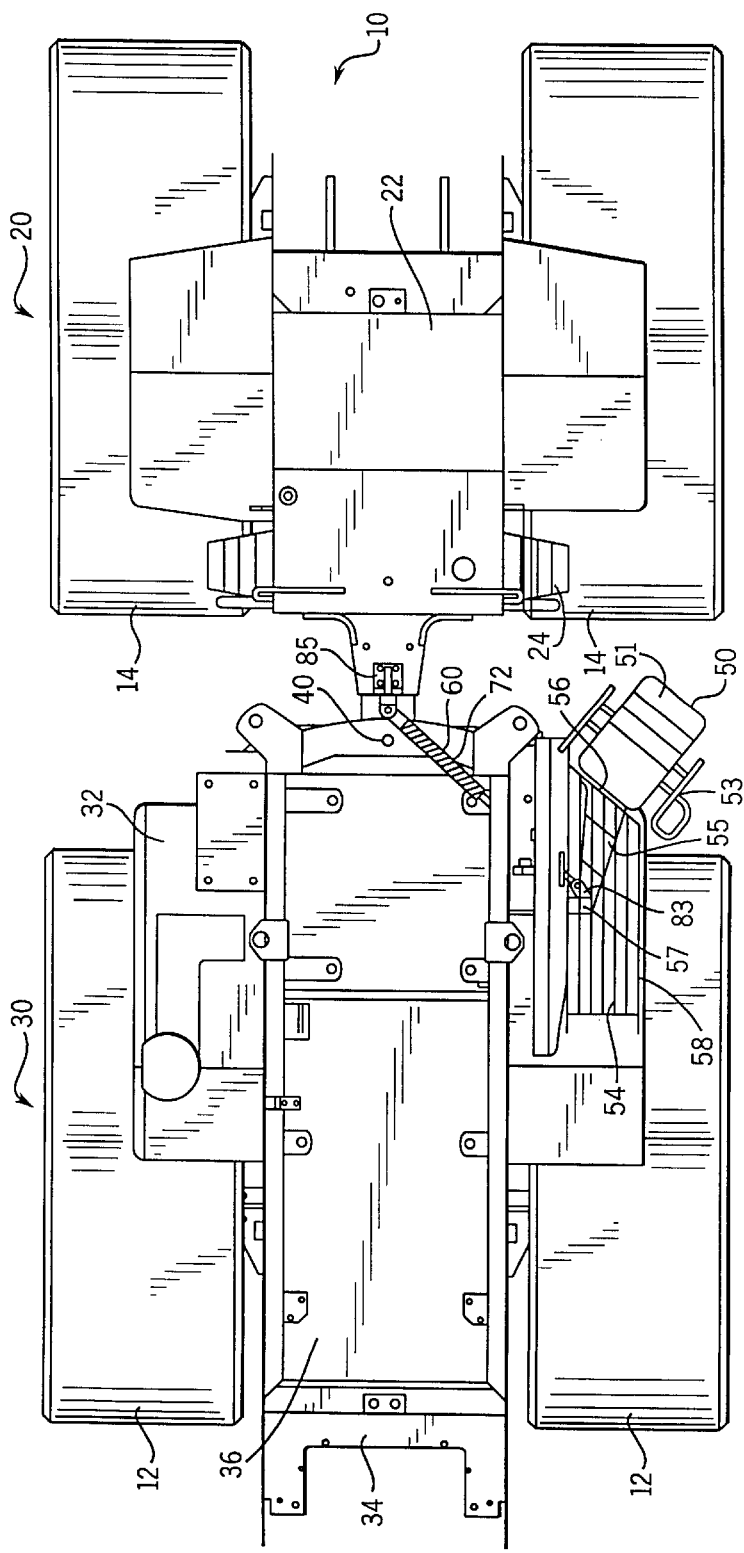
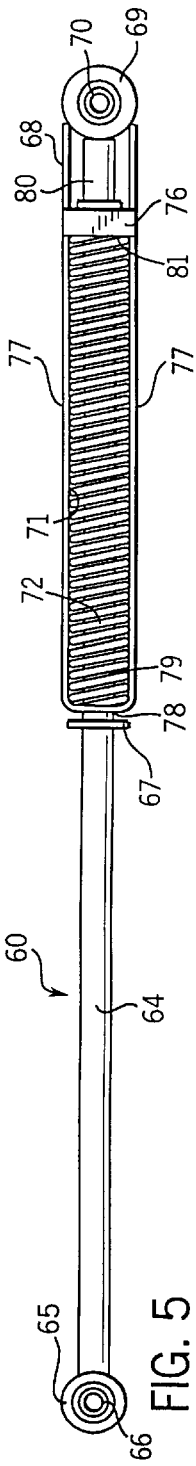
FIG. 3
FIG. 5

MOVEABLE STEPS FOR A VEHICLE

FIELD OF THE INVENTION

The invention generally relates to work vehicles having a step assembly provided to facilitate ingress and egress to an operator cab. In particular, the invention relates to an articulated work vehicle having a moveable step assembly. The step assembly moves in response to vehicle maneuvers, to avoid interference with the vehicle propulsion system.

BACKGROUND OF THE INVENTION

Work vehicles, including, but not limited to, agricultural work vehicles such as tractors and combines as well as construction equipment vehicles such as loaders and backhoes, can be configured as articulating vehicles, that is having a pivot intermediate the work vehicle's front end and rear end. A central pivot serves to improve maneuverability of large or long work vehicles. Such work vehicles may be configured using a system of wheels, a system of tracks, or a combination thereof, to propel the work vehicle. The use of a pivot in a work vehicle has many advantages including maneuverability at a work site, such as a farm field or a construction site, and maneuverability on public roads during transport from work site to work site.

Large work vehicles often require a system of steps by which an operator may gain access to the operator station from the ground, or gain access to the ground from the operator station. It is desirable for the system of steps to remain stable and usable throughout operation of the vehicle so that a person may gain access to or exit from the operator station during reasonably slow operation of the work vehicle.

It may be desirable to locate a step assembly adjacent the vehicle pivot. The region adjacent the vehicle pivot provides added complexity in mounting sensitive and complicated equipment due to the vehicles movement in the pivot area. Therefore, due to the simplicity of the step assembly and proximity of pivot region to the operator station, it may be desirable to mount a step assembly in the pivot region.

Placing any equipment in the pivot region provides difficulties because the equipment may interfere with the tires or tracks of the work vehicle when the vehicle makes a turn. Therefore, there is a need for a system of moveable steps whereby the steps move in response to the turn of the work vehicle. For example, if the steps were located on the right side of the tractor adjacent the pivot, a right hand turn would cause interference between the steps and the wheels or tracks of the work vehicle. Therefore, there is a need for a step assembly that moves away from the interference area during a right hand turn. It would be advantageous to have the step assembly remain fixed while the tractor is going substantially in a straight line or during a left hand turn (if the steps are mounted on the right hand side, and right hand turn if the steps are mounted on the left hand side) in which there is no interference between the step assembly and the tracks or wheels.

SUMMARY OF THE INVENTION

One embodiment of the present invention relates to a moveable step apparatus including a step mount, a step assembly moveably interconnected with the step mount, an actuator mount, and an actuator coupled with the step assembly and with the actuator mount. The actuator provides a force to the step assembly, in response to a motion communicated to the actuator, to selectively move the step assembly relative to the step mount.

Another embodiment of the present invention includes an articulated vehicle having a moveable step assembly. The articulated vehicle includes a front vehicle section, a rear vehicle section, a pivotable joint interconnecting the front vehicle section and the rear vehicle section, a step mount interconnected with the vehicle on one of the front vehicle section and the rear vehicle section, a step assembly movably interconnected with the step mount, an actuator mount interconnected with the vehicle, and an actuator interconnected with the step assembly and with the vehicle. The pivotable joint facilitates steering of the vehicle. The actuator provides a force to the step assembly in response to a vehicle motion communicated to the actuator, to selectively move the step assembly relative to the vehicle.

A further embodiment of the present invention provides an articulated vehicle having a moveable step assembly. The articulated vehicle includes a front vehicle section, a rear vehicle section, and a pivotable joint interconnecting the front vehicle section and the rear vehicle section. The articulated vehicle further includes a step mount interconnected with the vehicle on one of the front vehicle section and the rear vehicle section, a step assembly movably interconnected with the step mount, a first push arm interconnected with the step assembly, an arm mount interconnected with the vehicle, a second push arm interconnected with the arm mount and interconnected with the first push arm, a sleeve interconnected with the first push arm and the second push arm, a slider substantially fixed to the sleeve and slidable with respect to the second push arm, and a spring engaging the second push arm and the slider. The pivotable joint facilitates steering of the vehicle. The first push arm and the second push arm are forced to move in response to steering actions of the vehicle and the step assembly is forced to move in response to motions of the first push arm.

Another embodiment of the present invention includes a push arm assembly including a first rod coupled with the step assembly, a second rod coupled with the actuator mount, and a spring engaging the first rod and the second rod.

BRIEF DESCRIPTION OF THE DRAWINGS

The invention will become more fully understood from the following detailed description, taken in conjunction with the accompanying drawings, wherein like reference numerals refer to like parts, in which:

FIG. 3 is a top plan view of the work vehicle in a nominally straight position showing the step assembly in a nominal position;

FIG. 5 is a top plan view of the push arm assembly; and

DETAILED DESCRIPTION OF THE PREFERRED EMBODIMENTS

Figure 1:
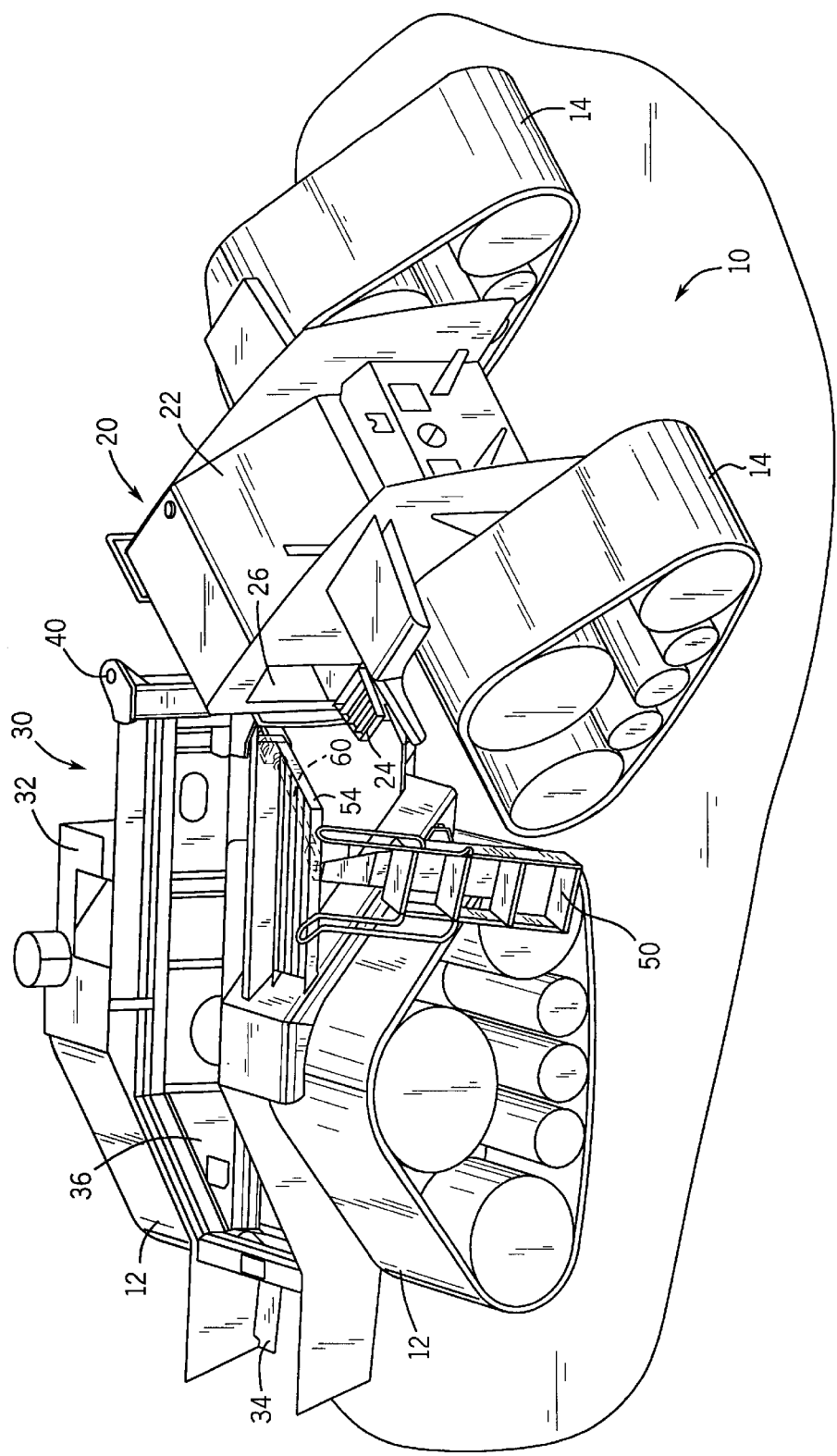
FIG. 1 is a perspective view of a work vehicle in a right hand turn position showing the step assembly in a non-interfering position.

Turning now to FIG. 1, a tractor 10 is shown, representative of work vehicles such as agricultural or construction vehicles. Tractor 10 is depicted having rear tracks 12, front tracks 14, a front tractor section 20, and a rear tractor section 30. Front tractor section 20 and rear tractor section 30 are connected via pivot 40 located intermediate front tractor section 20 and rear tractor section 30. Front section 20 has an operator station 22, an operator platform 24, and an operator entrance 26. Rear tractor section 30 has an engine compartment 32, a rear hitch 34, a load bin 36, a movable step assembly 50, step platform 54, and push rod assembly 60.

Tractor 10 can be configured to be used as a harvester, whereby harvesting equipment is attached to rear hitch 34 and the fruits of the harvest are deposited in load bin 36. Engine (not shown) in engine compartment 32 transmits a propulsive force by an appropriate drive train to rear and front tracks 12 and 14 that propel vehicle 10. Movable steps 50 are mounted to or mounted adjacent to step platform 54. Push rod assembly 60 is coupled to movable step assembly 50, on a first end, and coupled to pivot 40, on a second end.

Figure 4:
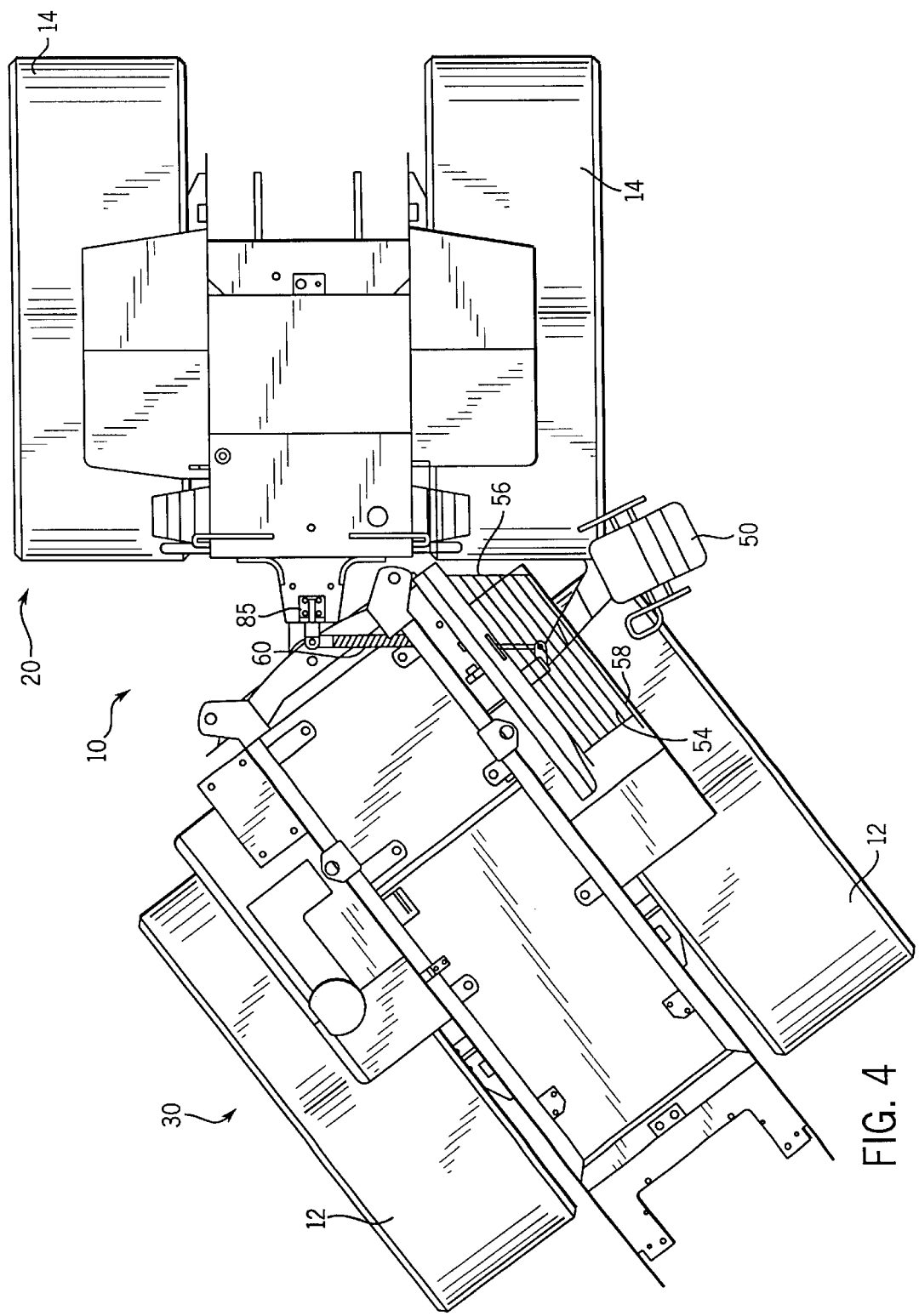
FIG. 4 is a top plan view of the work vehicle in a right hand turn position similar to FIG. 1 showing the step assembly in a non-interfering position.

FIG. 1 depicts tractor 10 in a right hand turn position. FIG. 1 also depicts step assembly 50 being mounted on the right side of tractor 10. FIG. 4 further depicts tractor 10 in a right hand turn similar to FIG. 1. Referring now to FIG. 3, tractor 10 is depicted in a nominally straight position whereby front tractor section 20 and rear tractor section 30 are substantially aligned. As shown in FIG. 3, movable step assembly 50 is in its nominal position. In its nominal position, step assembly 50 is substantially aligned with a first surface 56 of step platform 54. As depicted in FIG. 4, step assembly 50 is shown in its alternate position, being substantially aligned with second surface 58 of step platform 54 so as not to interfere with rear tracks 12 and front tracks 14. FIG. 5 depicts tractor 10 in a left hand turn position. Because, in a preferred embodiment, step assembly 50 is configured to be on the right side of tractor 10, a left hand turn does not cause interference between step assembly 50 and rear track 12 or front tracks 14. Therefore, it is desirable to have step assembly 50 remain in its nominal position, that is, substantially aligned with first surface 56 of step platform 54 during a left hand turn. It should however be noted that step assembly 50 could be configured on the left side of vehicle 10. With step assembly 50 on the left side of vehicle 10, step assembly 50 would move in response to a left hand turn and be in a nominal position while traveling substantially straight or performing a right hand turn.

Figure 2:
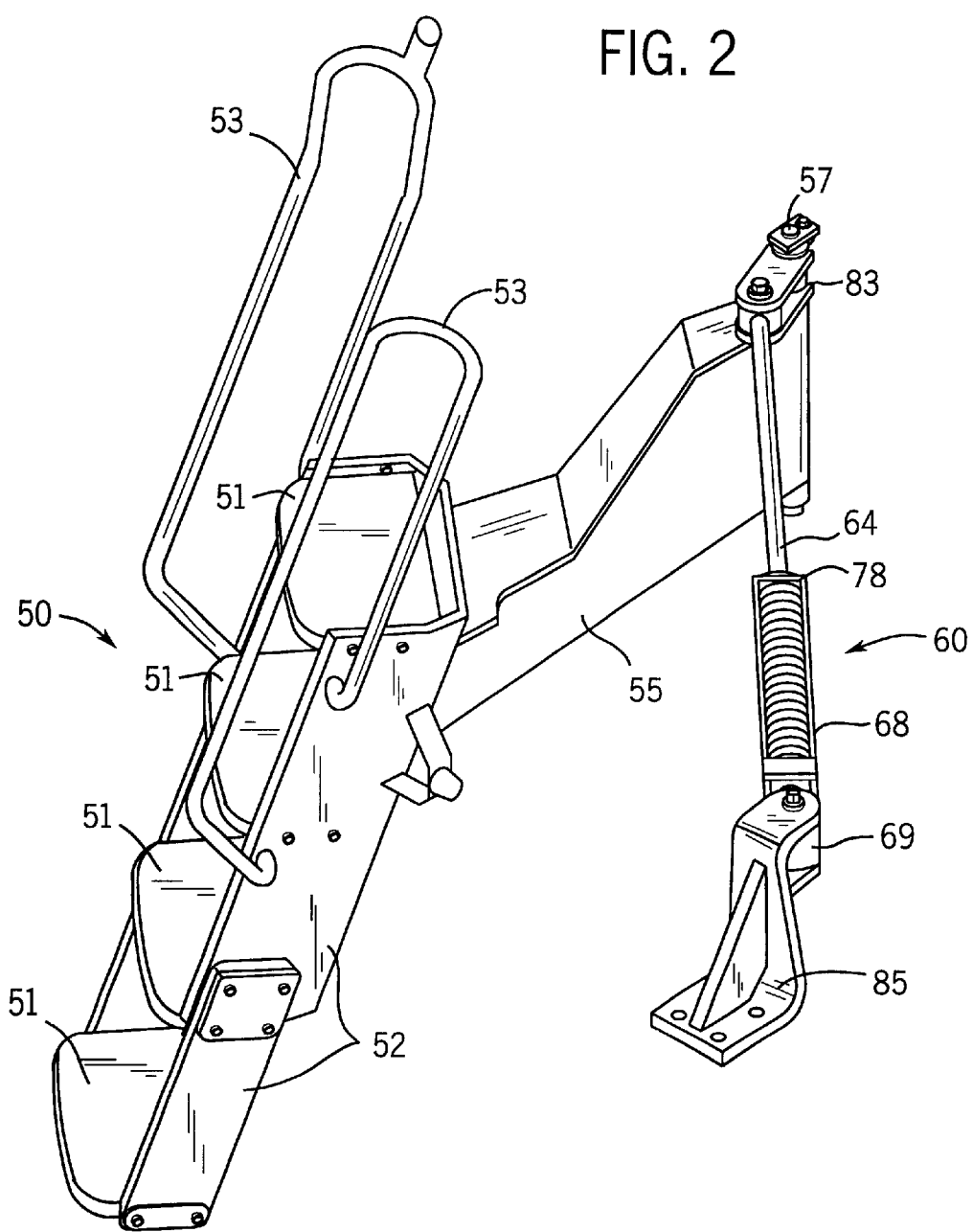
FIG. 2 is a perspective view of a step assembly showing the step assembly connected to a push arm assembly.

Referring now to FIG. 2, step assembly 50 is shown coupled to push rod assembly 60. Movable step assembly 50 has a multiplicity of stair treads 51, a set of stair stringers or supports 52, a set of rails 53, a support arm 55, and a step pivot 57. Stair treads 51 are connected to and supported by stair supports 52. Likewise, handrails 53 are connected to and supported by stair stringers 52. Support arm 55 is connected to stair supports 52 on a first end and rotatably mounted to step assembly pivot 57 on a second end.

Figure 6:
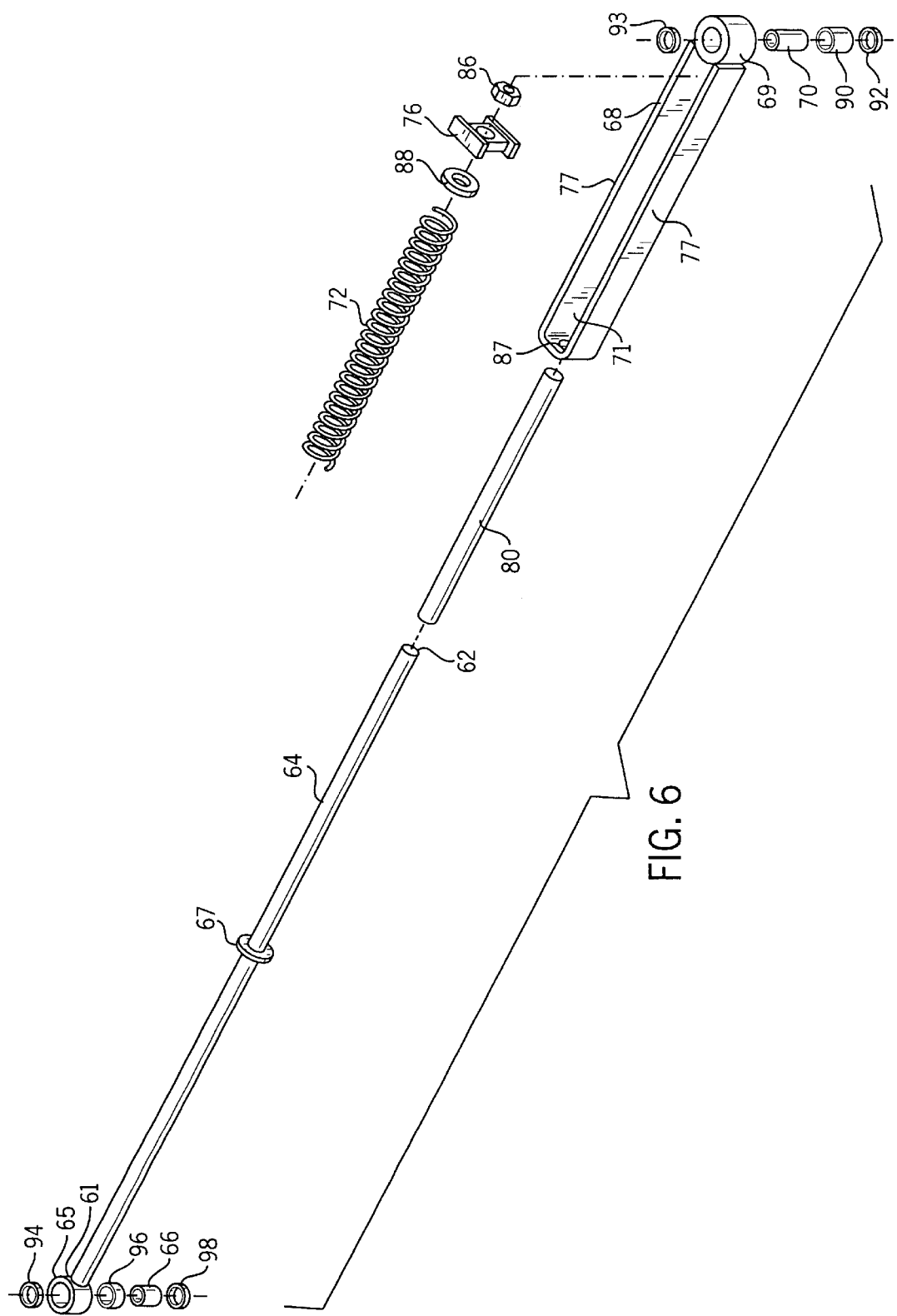
FIG. 6 is an exploded perspective view of the push arm assembly depicted in FIG. 5.

Referring now to FIG. 5 and FIG. 6, push arm assembly 60 has a first push rod 64, a second push rod 68, a spring 72, a slide 76, and a sleeve 80. First push rod 64 has a pivot coupling 65 on a first end, the pivot coupling having a bushing 66. As depicted in FIG. 6 bushing 66 is held in place by means of a second bushing 96 and two washers 94 and 98. First push rod 64 also has a stop 67, the stop being intermediate a first end 61 and a second end 62 of first push rod 64. Second push rod 68 has a pivot coupling 69 at a first end, the pivot coupling having a bushing 70. As depicted in FIG. 7 bushing 70 is held in place by a second bushing 90 and two washers 92 and 93. Second push rod 68 also has a chamber 71 including at least two sides 77 and an end 78 having a rod aperture (not shown). The second end of first push rod 64 enters the rod aperture in end 78 of second push rod 68. Sleeve 80 extends substantially the entire length of chambers 71, and second end of rod 64 is encased therein. Sleeve 80 extends through an aperture 87 in slide 76. Slide 76 is free to move along the length of chamber 71 while being retained to slide within chambers 71 and being mounted to sleeve 80 by a washer 88 and a nut 86. Second end of rod 64 and sleeve 80 extend through spring 72, spring 72 being situated substantially within chambers 71. A first end 79 of spring 72 engages end 78 of chamber 71. A second end of 81 of spring 72 engages slide 76.

As depicted in FIG. 2 pivot coupling 65 of first push rod 64 is pivotally attached to a link 83. Link 83 is rotatably mounted to step assembly pivot 57. Pivot coupling 69 of second push rod 68 is rotatably mounted to clevis 85.

In operation, when interference is an issue, as depicted in FIGS. 1 and 4, clevis 85 is configured to change position relative to the steering angle, as depicted in FIG. 4. The movement of clevis 85 causes end 78 of second push rod 68 to engage and abut stop 67 of first push rod 64. When end 78 pushes against stop 67 force is transmitted to coupling 65 of first push rod 64. This force causes step assembly 50 to pivot about fixed axis 57 moving step assembly 50 into its alternate position, substantially aligned with surface 58.

When tractor 10 returns to its nominal or straight position as depicted in FIG. 3, clevis 85 is substantially aligned with front tractor section 20. Also, step assembly 50 returns to its nominal position, substantially aligned with surface 56.

When a left hand turn of tractor 10 is made interference of rear tracks 12 and front tracks 14 with step assembly is not an issue. Therefore, it is desirable to have step assembly 50 substantially aligned with first surface 56. When tractor 10 undergoes a left hand turn, as well as a nominal straight position, as shown in FIG. 3, first push rod 64 and second push rod 68 separate creating a gap between stop 67 and end 78. Spring 72 is configured to make up the displacement between the two rods while allowing step assembly 50 to remain in place while clevis 85 and connecting link 83 rotate in opposite directions. During a left hand turn, slide 76 that is connected to sleeve 80 slides along sides 77 of chamber 71 thereby compressing spring 72, and thereby creating an elongated push arm assembly 60.

Push arm assembly 60 allows step assembly 50 to rotate when the vehicle makes a turn in one direction. In the figures shown, step assembly 50 rotates during a right hand turn and stays substantially stationary when the vehicle goes straight or engages in a left hand turn. Push arm assembly 60, therefore, serves to keep step assembly 50 stable and sturdy during operation of the tractor, thereby allowing ingress and egress from operator station 22. It is desirable to provide some amount of preload to spring 72 so that steps 50 are securely held in place, however, the preload should be low enough to prevent the steps from interfering with rear tracks 12 and front tracks 14 during a right hand turn.

In an alternative embodiment of the present invention, movable step assembly 50 may be moved, when interference is in issue, by an electric actuator or hydraulic actuator. An electric sensor may be used to measure steering angle at pivot 40 or alternatively on the steering column. The electrical sensor may be a potentiometer, a linear voltage displacement transducer, or other suitable sensor device. The sensor sends a signal to a control unit whereby the control unit provides an electric signal to a direct drive motor which causes the stair assembly to move. In a similar embodiment, the electrical sensor can be configured to send a signal to a control unit, the control unit communicating a signal to an electronic valve, the valve being connected to a hydraulic system, the hydraulic system having a hydraulic actuator. When appropriate, the hydraulic actuator is caused to move, thereby moving step assembly 50. Furthermore, in other embodiments of the present invention a hydraulic cylinder may act on a mechanical linkage to provide movement to step assembly 50. Also, when using a hydraulic actuator, an actuator input can be applied to the hydraulic cylinder through a mechanical linkage system or through an electro-mechanical system.

Turning more specifically to clevis 85, this clevis is configured to provide 2-axes of rotation, one axis along the longitudinal axis of section 20 and the other axis perpendicular to the longitudinal axis. This arrangement permits sections 20 and 30 to both twist and pivot relative to each other. Alternatively, link 83 could also be configured to provide such 2-axis rotation.

Although only a few exemplary embodiments of this invention have been described above, those skilled in the art will readily appreciate that many modifications are possible in the exemplary embodiments without materially departing from the novel teachings and advantages of this invention. As is readily indicated, the invention can be employed in a variety of ways and on a variety of articulated work vehicles. Further, the type of actuation mechanism and sensor mechanisms used may be varied in so far as they continue to accomplish functions related to selective step assembly movement. Further, the steps could be located on different sides and sections of the vehicle. Accordingly, all such modifications are intended to be included within the scope of the invention as defined in the following claims. Other substitutions, modifications, changes and omissions may be made in the design, operating conditions and arrangement of preferred and alternative embodiments without departing from the spirit of the invention as expressed in the appended claims.

What is claimed is:

1. A rotatable step apparatus for an articulated vehicle comprising:
   a step mount;
   a step assembly rotatably interconnected with the step mount;
   an actuator mount; and
   an actuator coupled with the step assembly and with the actuator mount,
   wherein the actuator provides a force to rotate the step assembly, in response to a steering motion of the articulated vehicle communicated to the actuator, to selectively move the step assembly relative to the step mount.

2. The moveable step apparatus of claim 1 wherein the actuator is a push arm assembly.

3. The moveable step apparatus of claim 2 wherein the push arm assembly further comprises:
   a first rod coupled with the step assembly;
   a second rod coupled with the actuator mount; and
   a spring engaging the first rod and the second rod.

4. An articulated vehicle having a moveable step assembly, the articulated vehicle comprising:
   a front vehicle section;
   a rear vehicle section;
   a pivotable joint interconnecting the front vehicle section and the rear vehicle section, the pivotable joint facilitating steering of the vehicle;
   a step mount interconnected with the vehicle on one of the front vehicle section and the rear vehicle section;
   a step assembly movably interconnected with the step mount;
   an actuator mount interconnected with the vehicle;
   and an actuator interconnected with the step assembly and with the vehicle;
   wherein the actuator provides a force to the step assembly in response to a vehicle motion communicated to the actuator, to selectively move the step assembly relative to the vehicle, and the step assembly is forced to move, by the actuator, to avoid interference with the section of the vehicle not having the step mount during vehicle maneuvers.

5. The articulated vehicle of claim 4 wherein the actuator is a push arm assembly.

6. The articulated vehicle of claim 5 wherein the push arm assembly further comprises:
   a first rod coupled with the step assembly;
   a second rod coupled with the actuator mount; and
   a spring engaging the first rod and the second rod.

7. The articulated vehicle of claim 4 wherein the step assembly moves, relative to the step mount, when the vehicle makes one of a right hand turn and a left hand turn, and the step assembly remains substantially fixed, relative to the step mount, when the vehicle makes the other of a right hand turn and a left hand turn.

8. The articulated vehicle of claim 7 wherein the vehicle is a tracked vehicle having at least one front set of tracks coupled with the front section and at least one rear set of tracks coupled with the rear section and wherein the step assembly is actuated to avoid interference with both the front set of tracks and the rear set of tracks throughout the entire range of steering angles of the articulated vehicle.

9. The articulated vehicle of claim 4 wherein the articulated vehicle has at least one wheel.

10. An articulated vehicle having a moveable step assembly, the articulated vehicle comprising:
    a front vehicle section;
    a rear vehicle section;
    a pivotable joint interconnecting the front vehicle section and the rear vehicle section, the pivotable joint facilitating steering of the vehicle;
    a step mount interconnected with the vehicle on one of the front vehicle section and the rear vehicle section;
    a step assembly movably interconnected with the step mount;
    a first push arm interconnected with the step assembly;
    an arm mount interconnected with the vehicle;
    a second push arm interconnected with the arm mount and interconnected with the first push arm;
    a sleeve interconnected with the first push arm and the second push arm;
    a slider substantially fixed to the sleeve and slidable with respect to the second push arm; and
    a spring engaging the second push arm and the slider;
    wherein the first push arm and the second push arm are forced to move in response to steering actions of the vehicle and the step assembly is forced to move in response to motions of the first push arm.

11. The articulated vehicle of claim 10 wherein the step assembly remains in a nominal position when the vehicle is being driven substantially straight.

12. An articulated vehicle having a moveable step assembly, the articulated vehicle comprising:

a first vehicle section;

a second vehicle section;

a pivotable joint interconnecting the first vehicle section and the second vehicle section, the pivotable joint facilitating steering of the vehicle;

a step mount coupled to one of the first vehicle section and the second vehicle section;

a step assembly rotatably interconnected with the step mount;

an actuator mount; and an actuator coupled to the step assembly and with the actuator mount, wherein the actuator provides a force to rotate the step assembly, in response to a steering motion of the articulated vehicle communicated to the actuator, to selectively move the step assembly relative to the step mount.

13. The articulated vehicle of claim 12 wherein the actuator includes a push arm assembly.

14. The articulated vehicle of claim 13 wherein the push arm assembly further comprises:

a first rod coupled with the step assembly;

a second rod coupled with the actuator mount; and a spring engaging the first rod and the second rod.

15. The movable step apparatus of claim 12, wherein the actuator mount includes a clevis, the clevis being coupled to one of the first vehicle section and the second vehicle section.

16. The articulated vehicle of claim 12 wherein the step assembly moves, relative to the step mount, when the vehicle makes one of a right hand turn and a left hand turn, and the step assembly remains substantially fixed, relative to the step mount, when the vehicle makes the other of a right hand turn and a left hand turn.

17. The articulated vehicle of claim 12 wherein the vehicle is a tracked vehicle having at least one front set of tracks coupled with the first vehicle section and at least one rear set of tracks coupled with the rear section and wherein the step assembly is actuated to avoid interference with both the front set of tracks and the rear set of tracks throughout the entire range of steering angles of the articulated vehicle.

18. The articulated vehicle of claim 12 wherein the articulated vehicle includes at least one wheel.

19. The articulated vehicle of claim 12 wherein the actuator includes:

a first push arm interconnected with the step mount;

a second push arm interconnected with the actuator mount and interconnected with the first push arm;

a sleeve interconnected with the first push arm and the second push arm.

20. The articulated vehicle of claim 19 wherein the actuator further includes:

a slider substantially fixed to the sleeve and slidable with respect to the second push arm; and a spring engaging the second push arm and the slider.

* * * * *